United States Patent [19]

Gulick

[11] Patent Number: 5,247,621
[45] Date of Patent: Sep. 21, 1993

[54] SYSTEM AND METHOD FOR PROCESSOR BUS USE

[75] Inventor: Dale E. Gulick, Austin, Tex.

[73] Assignee: Advanced Micro Devices, Inc., Sunnyvale, Calif.

[21] Appl. No.: 588,194

[22] Filed: Sep. 26, 1990

[51] Int. Cl.⁵ .............................. G06F 13/14
[52] U.S. Cl. ..................... 395/325; 364/242.31; 364/242.92; 364/240.5; 364/DIG. 1; 364/937.01; 364/926.91; 364/DIG. 2; 395/425
[58] Field of Search ... 364/200 MS File, 900 MS File, 364/242.3, 242.31, 242.92, 240.5, DIG. 1, 926.91, 937.01, DIG. 2; 395/325, 725, 275, 425

[56] References Cited

U.S. PATENT DOCUMENTS

| | | | |
|---|---|---|---|
| 4,626,985 | 12/1986 | Briggs | 395/800 |
| 4,737,932 | 4/1988 | Baba | 364/900 |
| 4,870,562 | 9/1989 | Kimoto et al. | 364/200 |
| 4,979,103 | 12/1990 | Kida et al. | 364/200 |
| 4,989,113 | 1/1991 | Hull, Jr. et al. | 395/425 |
| 5,089,951 | 2/1992 | Iijima | 395/275 |

*Primary Examiner*—Michael R. Fleming
*Assistant Examiner*—Glenn A. Auve
*Attorney, Agent, or Firm*—Johnson & Gibbs

[57] ABSTRACT

A microprocessor includes an internal memory and various subcomponents that allow the microprocessor to operate out of its internal memory during periods of time in which it does not have use of an external bus via which it may operate out of an external memory.

7 Claims, 1 Drawing Sheet

SYSTEM AND METHOD FOR PROCESSOR BUS USE

BACKGROUND OF THE INVENTION

1. Field of the Invention

The present invention relates to microprocessor architecture and, more particularly, to systems and methods for exercising microprocessor bus control.

2. Description of Related Art

The prior art is replete with computing systems including a processor, a system memory, and a bus interconnecting the processor, and the system memory. The prior art is also replete with computing systems that include peripheral devices [such as direct memory access ("DMA") controllers] in addition to the processor, memory and bus mentioned above, which peripheral devices effect access to the system memory by temporarily assuming control of the bus.

In conventional computer systems heretofore developed, the processor is designated the "master" of the bus and is allowed sole use of the bus (e.g., to access system memory) unless and until the processor relinquishes control of the bus to a peripheral device. Thus, heretofore, a peripheral device needing to access system memory has had to request use of the bus from the processor. If and when the processor is ready to relinquish use of the bus to the peripheral device, the processor effects a grant of temporary use.

A shortcoming and deficiency of the above-described types of systems relates to efficiency of processor operation during time periods in which a peripheral device has control of the system bus. Heretofore during time periods in which the processor has not had control of the bus it has been in a "hold" or "off" state. Thus, when not in control of the system bus, prior art processors effectively accomplish no work.

While the above-identified shortcoming and deficiency may be understandable and excusable in situations in which there is nothing that can be accomplished by the processor without the system bus (e.g., when the processor must have access to the system memory in order to operate), this shortcoming and deficiency directly lowers efficiency of system operation in situations in which the processor can perform useful functions without using the system bus.

A prime example of the latter type of situation is one in which the processor has an internal memory (e.g., actually on the processor chip), which internal memory is accessible via an internal bus, and in which the processor can operate without requiring any use of the external system bus whatsoever.

SUMMARY OF THE INVENTION

The present invention overcomes the shortcoming and deficiency of the prior art discussed above by providing a microprocessor which includes an internal memory and various subcomponents which allow the microprocessor to operate out of its internal memory during periods of time in which it does not have use of an external bus.

Accordingly, it is an object of the present invention to provide an improved system and method for processor bus use that does not necessarily entail a processor suspending operation when its external bus is relinquished.

It is also an object of the present invention to provide a microprocessor architecture having increased system performance.

Yet another object of the present invention is to provide an improved system and method for processor bus use that can be selectably enabled or disabled.

BRIEF DESCRIPTION OF THE DRAWINGS

Other objects, advantages, and novel features of the present invention will become apparent from the following detailed description of the invention when considered in conjunction with the accompanying drawings in which.

DETAILED DESCRIPTION OF THE INVENTION

Figure 1:
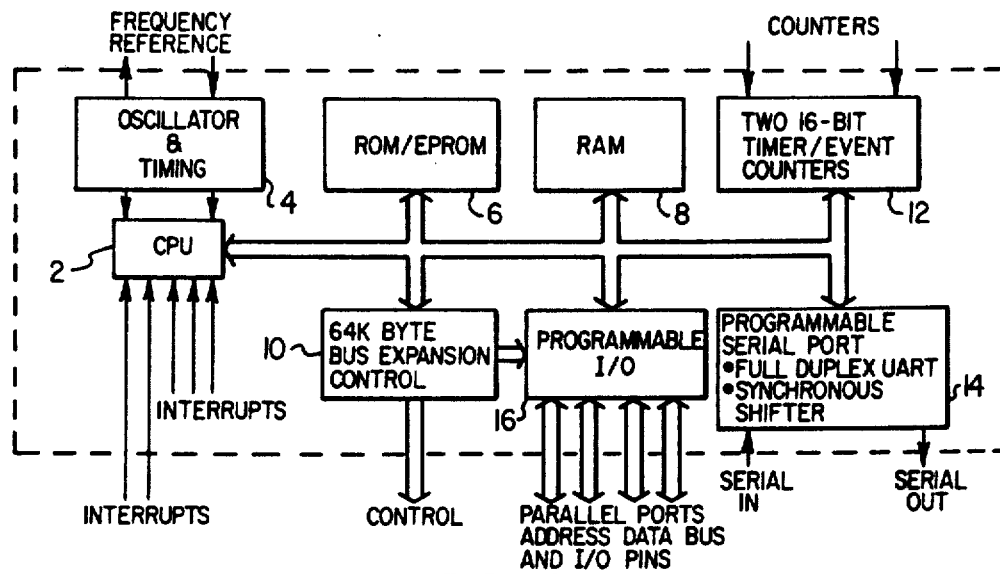
FIG. 1 is a block diagram of the general architectural structure of a microcontroller family.

Referring now to the drawings and, more particularly, to FIG. 1, there is shown a block diagram of the general architectural structure of the 8051 microcontroller family manufactured by the assignee of the present invention. Various aspects of this family of microcontrollers are discussed immediately below. Purposes of this discussion are to describe an environment in which the teachings of the present invention may usefully be applied and to provide general background as to operation of prior art microcontrollers; this discussion is not meant to be, nor should it in anyway be construed to be, limiting of the scope of the present invention.

With reference to FIG. 1, 8051 family products may be seen to include a CPU 2, an oscillator and timing circuit 4, a read-only memory/electrically programmable read-only memory ("ROM/EPROM") 6, a random access memory "RAM" 8, control circuitry 10, timer/counters 12, programmable serial port 14, and programmable I/O 16.

All 8051 family devices have separate address spaces for program memory and data memory. The logical separation of program and data memory allows the data memory to be accessed by 8-bit addresses, which can be more quickly stored and manipulated by an 8-bit CPU. Nevertheless, 16-bit data memory addresses can also be generated through various special registers in various 8051 microcontroller devices.

In 8051 family products the program memory can only be read, not written to. There can be up to 64K bytes of program memory. Data memory occupies a separate address space from the program memory. Up to 64K bytes of external RAM can be addressed in the external data memory space. The CPU 2 generates read and write signals, $\overline{RD}$ and $\overline{WR}$, as needed during external data memory in various 8051 family devices. The external program memory and external data memory can be combined by applying the $\overline{RD}$ and $\overline{PSEN}$ (program store enable) signals to the inputs of an AND gate and using the output of the gate as a read strobe to the external program/data memory.

The oscillator and timing circuitry 4 includes an oscillator which drives an internal clock generator, which provides the internal clocking signals to the chip. The internal clocking signals are at half the oscillator frequency, and define the internal phases, states, and machine cycles. A machine cycle consists of 6 states (12 oscillator periods). Each state is divided into a phase 1 half, during which a phase 1 clock is active, and a phase 2 half, during which a phase2 clock is active. Thus, a machine cycle consists of 12 oscillator periods. Each phase lasts for one oscillator period. Each state lasts for two oscillator periods. Typically, arithmetic and logical operations take place during phase 1 and internal register-to-register transfers take place during phase 2.

All four ports shown connected to programmable input/output circuitry 14 in FIG. 1 are bi-directional. Each port consists of a latch (special function registers P0 through P3), an output driver, and an input buffer. The output drivers of Ports 0 and 2, and the input buffers of Port 0, are used in accesses to external memory. In this application, Port 0 outputs the low byte of the external memory address, time-multiplexed with the byte being written or read. Port 2 outputs the high byte of the external memory address when the address is 16 bits wide. Otherwise, the Port 2 pins continue to emit the P2 special function register ("SFR") contents. All the port 3 pins (and, in certain cases, two of the Port 1 pins) are multi-functional. They are not only Port pins, but also serve various special functions such as timer/counter external input and timer/counter capture/reload trigger.

With respect to accessing external memory, in 8051 family devices access to external memory are of two types: accesses to external program memory and accesses to external data memory. Accesses to external program memory use a signal $\overline{PSEN}$ (programs store enable) as the read strobe. Accesses to external data memory use $\overline{RD}$ (external data memory read strobe) or $\overline{WR}$ (external data memory write strobe) to strobe the memory. Fetches from external program memory always use a 16-bit address. Accesses to external data can use either a 16-bit address or an 8-bit address. Whenever a 16-bit address is used, the high byte of the address comes out on Port 2, where it is held for the duration of the read or write cycle. It should be noted that the Port 2 drivers use strong pull-ups during the entire time that they are emitting address bits that are 1s. During this time the Port 2 latch (the special function register) does not have to contain 1s, and the contents of the Port 2 SFR are not modified. If the external memory cycle is not immediately followed by another external memory cycle, the undisturbed contents of the Port 2 SFR will reappear in the next cycle. If an 8-bit address is used, the contents of the Port 2 SFR remain at the Port 2 pins throughout the external memory cycle. This facilitates paging. In any case, the low byte of the address is time-multiplexed with the data byte on Port 0. An ADDR/data signal drives two field-effect transistors in the Port 0 output buffers. Thus, in such applications, the Port 0 pins are not open drain outputs, and do not require external pullups. Signal ALE (address latch enable) is used to capture the address byte into an external latch. The address byte is valid at the negative transition of ALE. Then, in a write cycle, the data byte to be written appears on Port 0 just before $\overline{WR}$ is activated, and remains there until after $\overline{WR}$ is deactivated. In a read cycle, the incoming byte is accepted at Port 0 just before the read strobe is deactivated.

During any access to external memory, the CPU 2 writes OFFH to the Port 0 latch (the special function register), thus obliterating whatever information the Port 0 SFR may have been holding.

External program memory is accessed under 2 conditions: (1) whenever signal $\overline{EA}$ is active; or (2) whenever the program counter ("PC") contains a number that is larger than OFFFH (1FFFH for certain family members). This requires that ROMless versions have $\overline{EA}$ wired low to enable the lower 4K (or 8K for various family members) programmed bytes to be fetched from external memory. When the CPU is executing out of external program memory, all 8 bits of Port 2 are dedicated to an output function and may not be used for general purpose I/O. During external program fetches they output the high byte of the PC. During this time the Port 2 drivers use the strong pullups to emit PC bits that are 1s.

The read strobe for external fetches is $\overline{PSEN}$, which is not activated for internal fetches. When the CPU is accessing external program memory, $\overline{PSEN}$ is activated twice every cycle (except during a move carry bit or "MOVX" instruction) whether or not the byte fetch is actually needed for the current instruction. When $\overline{PSEN}$ is activated, its timing is not the same as $\overline{RD}$. A complete $\overline{RD}$ cycle, including activation and deactivation of ALE and $\overline{RD}$, takes 12 oscillator periods. A complete $\overline{PSEN}$ cycle, including activation and deactivation of ALE and $\overline{PSEN}$, takes 6 oscillator periods.

The main function of ALE is to provide a properly timed signal to latch the low byte of an address from P0 to an external latch during fetches from external program memory. For that purpose, ALE is activated twice every machine cycle. This activation takes place even when the cycle involves no external fetch. The only time an ALE pulse does not come out is during an access to external data memory. The first ALE of the second cycle of an MOVX instruction is missing. Consequently, in any system that does not use external data memory, ALE is activated at constant rate of 1/6th the oscillator frequency, and can be used for external clocking or timing purposes.

In some applications it is desirable to execute a program from the same physical memory that is being used to store data. In the 8051 family, the external program and data memory spaces can be combined by ANDing $\overline{PSEN}$ and $\overline{RD}$. A positive-login AND of these two signals produces an active-low read strobe that can be used for the combined physical memory. Since the $\overline{PSEN}$ cycle is faster than the $\overline{RD}$ cycle, the external memory needs to be fast enough to accommodate the $\overline{PSEN}$ cycle.

The 8051 family devices have two 16-bit timer/counter registers: timer 0 and timer 1. Certain family members also have one more: timer 2. All such timers can be configured to operate either as timers or event counters. When performing a "timer" function, the register is incremented every machine cycle. Thus, one can think of it as counting machine cycles. Since the machine cycle consists of 12 oscillator periods, the count rate is 1/12th of the oscillator frequency. When performing a "counter" function, the register is incremented in response to a 1-to-0 transition at its corresponding external input pin, T0, T1 or T2. In this function, the external input is sampled during part of every machine cycle. When the samples show a high in 1 cycle, and a low in the next cycle, the count is incremented. The new count value appears in the register during a part of the cycle following the one in which the transition was detected. Since it takes 2 machine cycles (24 oscillator periods) to recognize a 1-to-0 transition, the maximum count rate is 1/24th of the oscillator frequency. There are no restrictions on the duty cycle of the external input signal, but to ensure that a given level is sampled at least once before it changes, it should be held for at least one full machine cycle. In addition to the "timer" or "counter" selection, timer 0 and timer 1 have 4 operating modes from which to select. Putting either timer into mode 0 makes it look like an 8-bit counter with a divided-by-32 prescaler. Mode 1 is the same as mode 0, except that the timer register is being run with all 16 bits. Mode 2 configures the timer register as an 8-bit counter with automatic reload. A timer in mode 3 simply holds its count.

With the above background, a full and complete understanding of the present invention is now possible.

Figure 2:
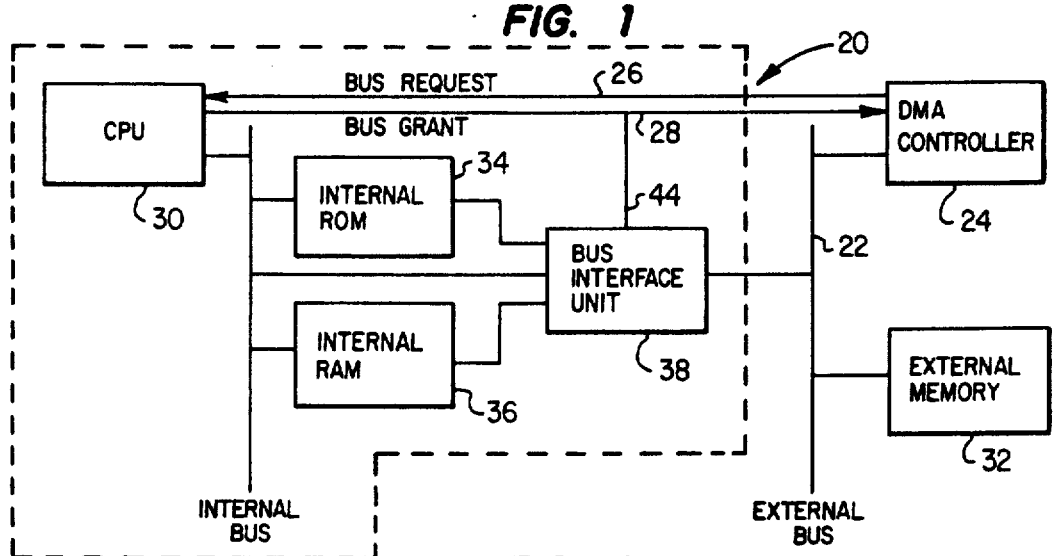
FIG. 2 is a block diagram of a microprocessor system according to the teachings of the present invention.

Referring to FIG. 2, there is shown a simplified block diagram of a new Ultra High Performance ("UHP") microcontroller or microprocessor 20 that has been developed by the assignee of the present invention. Microprocessor 20 has a number of possible applications, one of which applications involves its incorporation into an ISDN Telephone Chip ("ITP"). Microprocessor 20, as will be appreciated from the discussion below, is a redesigned 8051 type processor that is capable of substantially higher performance than has been heretofore realized.

In general, the present invention is directed to how a processor relates or reacts to a request for ownership of its external bus, e.g. external bus 22 of processor 20 shown in FIG. 2. Normally a request for ownership of a bus comes from a direct memory access ("DMA") controller, such as DMA controller 24 in FIG. 2. What this means in general terms is that some device peripheral to the microprocessor is asking the processor to not use its bus, or to relinquish its bus, so that this peripheral can become the master of that bus for a period of time.

As is generally understood and appreciated by those skilled in the art, the idea behind direct memory access control is that some peripheral device needs to talk to the system memory and to do that it has to tell the master of the system bus, which is normally the microprocessor, to relinquish the bus and allow it to become the master for some period of time. This can be done by using two signals—a bus request signal and a bus grant signal—which signals are respectively indicated by reference numerals 26 and 28 in FIG. 2. The peripheral device, e.g., DMA controller 24, can issue a bus request to the microprocessor 20 (more specifically, CPU portion 30 of microprocessor 20) saying, effectively "please relinquish your bus." If and when the microprocessor 20 is ready to relinquish the bus, it asserts a bus grant signal, transferring access to the bus 22 to the DMA controller 24.

As discussed in the description of related art sections above, a shortcoming of the prior art is that when microprocessors have given up their external buses (e.g., to DMA controllers), those microprocessors have stopped doing any work. Such microprocessors have effectively gone into a "hold state" until the bus is relinquished, at which time those microprocessors have been capable of working again. Such operation makes perfectly good sense if memory is all external (e.g., if the total system has memory only in the form of external memory 32 shown in FIG. 2). In such cases the relevant processor could not do any work unless it could get access to its external memory.

Part of the development of such processors as the UHP has involved materially incorporating a memory onto the processor chip. This internal memory is shown as internal read only memory (ROM) 34 and internal random access memory (RAM) 36 shown in FIG. 2. With such a configuration, a microprocessor (or, more specifically, CPU 30) can talk to its internal memory 34, 36, without having to use the external bus 22. At the same time, the DMA function can take place using the external bus 22 and external memory 32 so that the processor 20 can continue to operate out of the internal memory 34, 36 while the DMA controller 24 is talking to the external memory 32. This can be accomplished because there is no conflict regarding need for or use of the bus 22.

The present invention, in essence, provides a system and method for allowing efficient uses of resources as described above. According to the teachings of the present invention, a DMA controller 24 or other peripheral device that wants control of the external bus 22 generates a bus request signal (or "hold" signal) that is transmitted to the CPU portion of a processor 20 controlling the external bus 22. The processor 20, when it is through using the external bus 22, issues a bus grant (or "hold acknowledge" signal) that is transmitted back to the DMA controller 24. The DMA controller 24 then has use of the external bus 22 to access external memory 32. The processor 20, on the other hand, can continue to execute instructions as long as it does not need to talk to the external bus. This period of time can be significant as the processor 20 includes an internal memory 34 and 36. According to the teachings of the structure and operation of the present invention, the processor 20 does not go into a hold state until it needs the external bus. It has relinquished the bus so it has to wait, but it doesn't automatically shut off.

Referring still further to FIG. 2, the shown embodiment of the present invention may also be seen to include a bus interface unit 38. This unit 38 is essentially a piece of logic internal to the processor 20 that generates bus cycles on the external bus 22. There must be some kind of control signal that turns the bus interface unit 38 off. Such a control signal can consist of the bus grant signal (e.g., via, in part, line 44). This accounts for turning the bus interface unit 38 off if the bus is granted to a peripheral of some sort.

Figure 3:
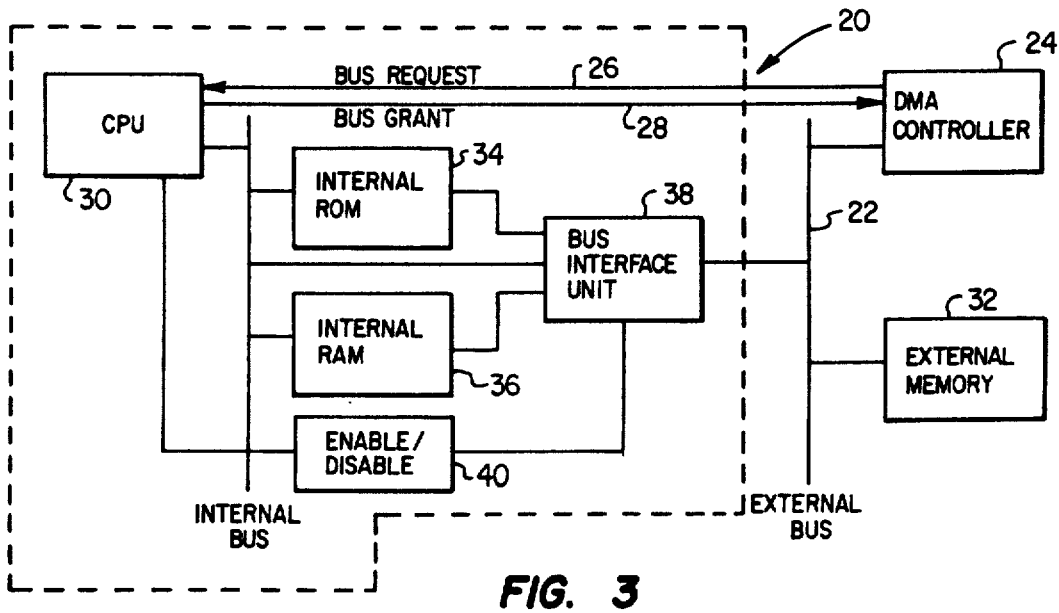
FIG. 3 is a block diagram of an alternative embodiment of a microprocessor system according to the teachings of the present invention.

Referring now to FIG. 3 (wherein for clarity and convenience identical reference numerals to those used in FIG. 2 are used to designate like or similar elements in those two FIGS.), an alternative embodiment of the present invention is shown therein. This embodiment may be seen to comprise an invention enable/disable means 40. This means 40 can be seen to be operatively disposed between the bus interface unit 38 and the CPU 30. This means can be enabled to enable the invention, i.e., to cause it to work; or, on the other hand, this means can be disabled so that the processor 20 behaves like prior art processors that quit working when they do not have use of their external buses. This means can be affected by an option register that can select or deselect operation of the invention. In fact, any bit in a register can be operatively configured to enable or disable the present invention within a processor 20.

It should be clear from the foregoing that the present invention provides a microprocessor which includes an internal memory and various subcomponents that allow the microprocessor to operate out of its internal memory during periods of time in which it does not have use of an external bus. Thus, the present invention provides a microprocessor architecture having increased system performance.

Obviously, numerous modifications and variations are possible in view of the above teachings. Accordingly, within the scope of the appended claims, the present invention may be practiced otherwise than as specifically described herein.

What is claimed is:

1. A single chip microprocessing system including a central processing unit operatively connectable to an external memory by an external bus which said central processing unit controls, said single chip microprocessing system comprising:
   an internal memory;
   an internal bus interconnecting said internal memory and said central processing unit;
   means internal to said central processing unit for allowing operation of said central processing unit using said internal memory during time periods in which said central processing unit does not require use of said external bus; and
   means for optionally enabling or disabling said means for allowing operation of said central processing unit using said internal memory during time periods in which said central processing unit does not require use of said external bus, said means for optionally enabling or disabling operatively connected to said central processing unit, wherein said means for optionally enabling or disabling said means for allowing operation of said central processing unit using said internal memory during time periods in which said central processing unit does not require use of said external bus comprises an option register operatively connected to said central processing unit.

2. The single chip microprocessing system of claim 1, wherein said internal memory comprises a read-only memory.

3. The single chip microprocessing system of claim 2, wherein said internal memory further comprises a random access memory.

4. A microcontroller system comprising:
   an internal bus;
   an internal memory connected to said internal bus;
   a bus interface unit connected to said internal bus, said bus interface unit further connected to an external bus controlled by said microcontroller system, said external bus having an external memory connected thereto, said bus interface unit having means for receiving bus request signals from an external direct memory access controller and means for sending bus grant signals to said direct memory access controller; and
   a central processing unit connected to said internal bus, said central processing unit programmed to operate with accesses to said internal memory when said external bus is granted to said direct memory access controller and when said central processing unit does not need to access said external memory to operate.

5. A system as recited in claim 4, wherein said internal memory comprises data random access memory and data read-only memory.

6. A system as recited in claim 5, wherein said external memory comprises data random access memory.

7. A system as recited in claim 6, wherein said microcontroller further comprises a timer connected to said internal bus, a serial port connected to said internal bus, and an analog-digital converter connected to said internal bus.

* * * * *